United States Patent [19]

McBain et al.

[11] Patent Number: 5,428,068

[45] Date of Patent: * Jun. 27, 1995

[54] UNSATURATED POLYESTER-MODIFIED FLEXIBLE POLYMERS FOR USE IN MOLDING COMPOSITION

[75] Inventors: Douglas S. McBain, Norton, Ohio; Andrew L. Ratermann, Indianapolis, Ind.; Earl G. Melby, Uniontown; Kevin P. LaJudice, Akron, both of Ohio

[73] Assignee: GenCorp Inc., Fairlawn, Ohio

[ * ] Notice: The portion of the term of this patent subsequent to Jan. 31, 2012 has been disclaimed.

[21] Appl. No.: 1,476

[22] Filed: Jan. 7, 1993

Related U.S. Application Data

[63] Continuation-in-part of Ser. No. 828,080, Jan. 30, 1992, Pat. No. 4,362,819.

[51] Int. Cl.$^6$ ............................................. C08L 67/06
[52] U.S. Cl. ................................... 523/522; 525/43; 525/44; 525/49; 525/90; 525/92 F
[58] Field of Search ................................ 525/43, 44, 49; 523/522

[56] References Cited

U.S. PATENT DOCUMENTS

| | | |
|---|---|---|
| 2,750,314 | 6/1956 | Bemmels . |
| 2,829,131 | 4/1958 | Greenspan et al. . |
| 2,838,478 | 6/1958 | Hillyer et al. . |
| 3,119,711 | 1/1964 | Starmann . |
| 3,429,951 | 2/1969 | Childers . |
| 3,437,517 | 4/1969 | Eilerman . |
| 3,538,043 | 11/1970 | Herold . |
| 3,555,112 | 1/1971 | Winkler . |
| 3,651,014 | 3/1972 | Witsiepe . |
| 3,718,714 | 2/1973 | Comstock . |
| 3,827,230 | 8/1974 | Marzocchi et al. . |
| 3,888,645 | 6/1975 | Marzocchi . |
| 4,020,036 | 4/1977 | South, Jr. . |
| 4,031,165 | 6/1977 | Saiki et al. . |
| 4,051,199 | 9/1977 | Udipi et al. . |
| 4,076,767 | 2/1978 | Samejima . |
| 4,131,725 | 12/1978 | Udipi . |
| 4,242,415 | 12/1980 | Feltzin et al. . |

(List continued on next page.)

FOREIGN PATENT DOCUMENTS

| | | |
|---|---|---|
| 0234902 | 9/1987 | European Pat. Off. . |
| 0242027 | 10/1987 | European Pat. Off. . |
| 0273522 | 7/1988 | European Pat. Off. . |
| 0310167 | 4/1989 | European Pat. Off. . |
| 0317628 | 5/1989 | European Pat. Off. . |
| 305159 | 12/1988 | Japan . |
| 2165548 | 4/1986 | United Kingdom . |

OTHER PUBLICATIONS

Database WPI Sep. 1992, Derwent Publications LTD., London, GB; AN 92-354793 & JP-A-4 258 637 (Dainippon Ink & Chem KK) 14 Sep. 1992, "abstract."

Database WPI, Week 9223, Derwent Publications Ltd., London, GB; AN 92-188159 & JP-A-121 756 (Fjuitsu Ltd) 22 Apr. 1992, "abstract."

Journal of Applied Polymer Science, vol. 31, No. 1, Jan. 1986, New York, USA, pp. 55-63, Subhas C. Shit, Beni Madhab Mahoto, Mrinal M. Miati, Sukumar Maitt *New Block Copolymers II. Synthesis and Characterization of an ABA-Type Block Copolymer*, "abstract."

Primary Examiner—Patricia A. Short
Attorney, Agent, or Firm—Robert F. Rywalski; Samuel B. Laferty

[57] ABSTRACT

This invention relates to a thermosetting unsaturated polyester or vinyl ester resin compositions modified with AB or ABA block copolymers. The A blocks are unsaturated polyester while the B blocks are flexible poller having a Tg of 0° C. or lower. The blocks are generally separately prepared having a variety of terminal groups such as hydroxyl, carboxyl, amine, or isocyanate groups, but low molecular weight A blocks can be prepared in situ on the B blocks, The functionality of the blocks can be controlled to get AB or ABA diblocks and polyblocks, These modified unsaturated polyester or vinyl ester resin compositions have higher flexural strain to failure and are generally tougher than standard resins without modification. Control of the reaction conditions and the functionality of the blocks prior to coupling minimizes the formation of $A(BA)_n$ where n is an integer above 1.

27 Claims, No Drawings

U.S. PATENT DOCUMENTS

| | | |
|---|---|---|
| 4,255,299 | 3/1981 | Diamon . |
| 4,290,939 | 9/1981 | Bertsch . |
| 4,309,473 | 1/1982 | Minamisawa et al. . |
| 4,329,438 | 5/1982 | Yamori et al. . |
| 4,341,672 | 7/1982 | Hsich et al. . |
| 4,413,072 | 11/1983 | Hess . |
| 4,419,487 | 12/1983 | Rowe . |
| 4,478,963 | 10/1984 | McGarry . |
| 4,515,710 | 5/1985 | Cobbledick . |
| 4,524,178 | 1/1985 | Hefner et al. . |
| 4,530,962 | 7/1985 | Alexander . |
| 4,562,115 | 12/1985 | Hergenrother . |
| 4,748,064 | 5/1988 | Harpell et al. . |
| 4,783,544 | 11/1988 | Yokoshima et al. . |
| 4,833,210 | 5/1989 | Fujii et al. . |
| 4,851,474 | 7/1989 | Willis . |
| 4,851,476 | 7/1989 | Willis . |
| 4,913,955 | 4/1990 | Noda et al. . |
| 4,970,265 | 11/1990 | Willis . |
| 4,981,916 | 1/1991 | Willis . |
| 5,084,508 | 1/1992 | Kagaya et al. . |
| 5,122,553 | 6/1992 | Takayama et al. . |

UNSATURATED POLYESTER-MODIFIED FLEXIBLE POLYMERS FOR USE IN MOLDING COMPOSITION

CROSS REFERENCE

This application is a continuation-in-part application of U.S. patent application Ser. No. 07/828,080 filed Jan. 30, 1992, now U.S. Pat. No. 4,362,819, entitled "Polyester-Flexible Polymer Block Copolymers and Mixtures Thereof."

FIELD OF INVENTION

This invention relates to a thermosetting unsaturated polyester or vinyl ester resin compositions modified with a AB, ABA, or A(BA)$_n$ block copolymer where B is a flexible polymer and A is an unsaturated polyester block. These thermosetting resins are crosslinkable with ethylenically unsaturated resins. They can be used in various molding compositions such as sheet, thick, fiber reinforced, and resin transfer.

BACKGROUND

Unsaturated polyester resins are well-known and useful materials for making molding compositions with a broad application in the manufacture of automotive and other products. One of the main deficiencies of cured unsaturated polyesters and fiber reinforced polyesters (FRP's) made from then is the inherent brittleness of the polymer matrix. Cracking at room and elevated temperatures is a principal cause of failure in production and in service of the molded parts.

A number of strategies for improving the toughness and crack resistance of polymeric materials have been demonstrated in thermoset epoxies. The most common and successful technique is the creation of a second elastomeric phase through a phase separation process during cure. This process has found only limited success in unsaturated polyesters for several reasons. The reactive liquid rubbers used to make the elastomer phase contribute to an undesirable high viscosity, the rubber phase separates before curing, and the reactive liquid rubbers contribute to higher shrinkage resulting in poor surface quality of the molded part.

U.S. Pat. No. 4,530,962 discloses a method of reacting an epoxy resin with a low molecular weight elastomer having reactive end groups. This helps solve the phase separation problems with elastomers because the epoxy groups help solubilize the elastomer in unsaturated polyester resins.

U.S. Pat. No. 4,290,939 discloses a second approach to incorporating toughening unsaturated polyesters. A reactive liquid polymer is coreacted with the precursors to an unsaturated polyester resin. Reactive groups on the ends of the reactive liquid polymers are coreacted into the unsaturated polyester chains, thus increasing the solubility of the reactive liquid polymers in the resin compositions. This process creates an unsaturated polyester resin of diverse composition that is subsequently used as a sole polyester and which is crosslinked with an ethylenically unsaturated monomer.

The method of U.S. Pat. No. 4,290,939 forces the reactive liquid polymer to undergo the high temperature condensation cooking process used to make the unsaturated polyester. The polymers formed by this process potentially have one or more reactive liquid polymers incorporated randomly in their backbone. No control over the microstructure of the unsaturated polyester is achieved other than controlling the number of residual carboxyls or hydroxyls which determine the molecular weight of the polymers.

European Patent Application 87301544.0 discloses unsaturated polyester compositions containing at least one block copolymer. The block copolymer includes both polyester parts and liquid rubber compound parts as constituent segments. When pre-made unsaturated polyester blocks were linked to liquid rubber blocks in production examples 4 and 8 using difunctional isocyanates in a one step process, they obtained, in addition to the desired block copolymers, "crosslinked" by-products of unsaturated polyesters and polybutadiene glycols.

SUMMARY OF THE INVENTION

A variety of block copolymers of AB, ABA, or A(BA)$_n$ structure, where n is from 2 to 5, are disclosed as modifiers for unsaturated polyesters. The B block is a previously prepared low Tg polymer with reactive end groups. The A blocks, which are unsaturated polyesters, can be made in situ on the B block when the molecular weight of the A block is below about 500 to 600 or the A blocks can be prepared separately and then coupled to the B block. The A and B blocks can be monofunctional or difunctional when coreacting to form block copolymers with different number(s) of blocks.

DETAILED DESCRIPTION

The B portion of the block copolymers of the present invention can generally be any flexible polymer. Such flexible polymers are generally defined as any polymer which has a Tg of about 0° C. or less and preferably below minus 20° C., often are liquid, and are readily known in the art and to the literature, including the preparation thereof.

One such class of flexible polymers is the various conjugated dienes made from one or more monomers having from 4 to 12 carbon atoms, desirably from 4 to 8 carbon atoms with 4 or 5 carbon atoms being preferred. Examples of specific dienes include butadiene, isoprene, 2,3-dimethyl-1,3-butadiene, pentadiene, hexadiene, 4,5-diethyl-1,3-octadiene, and the like, with butadiene and isoprene being preferred. The structure of such conjugated dienes is generally such that it has a Tg within the above-noted ranges. Such polymers are terminated with either one or two functional end groups wherein the functional end group is hydroxyl, amine, or carboxyl. Thus, the B block can be a mono- or di- hydroxyl terminated flexible polymer, a mono or diamine terminated flexible polymer, or a mono- or di- carboxyl terminated flexible polymer. Such polymers are well-known to the art and are commercially available as from the BFGoodrich Chemical Co., under the Hycar ® trademark.

Another class of the B block flexible polymer is the various hydrogenated dienes or polyolefins which are mono or di-hydroxyl, carboxyl, or amine terminated. Such polymers, as well as the preparation thereof, are well known to the art and to the literature. Typical diene polymers are made from one or more conjugated dienes, having from 4 to 10 carbon atoms, such as 1,3-butadiene, isoprene, dimethyl butadiene, and the like. The polymerization of the diene monomer, typically, may be done via anionic initiation (e.g. with di-lithium hydrocarbyl initiators) or via free-radical polymerization, e.g. by initiation with hydrogen peroxide, which also introduces hydroxy end groups. In case of anionic polymerization, OH-end groups are advantageously introduced by reaction of the polymeric carbanion chain ends with ethylene oxide. These techniques are generally well known to the literature. The hydroxy-functional polydienes may be hydrogenated, for example, partially or substantially (i.e., at least 50, 70, or 90 percent of the unsaturated sites), and even completely hydrogenated, according to any conventional method known to the art and to the literature. Complete hydrogenation of various diene polymers such as 1,4-polyisoprene is equivalent to an alternating ethylene/propylene hydrocarbon polymer. The hydrocarbon polymers generally have a number average molecular weight from about 500 to 15,000 and preferably from about 1,000 to about 8,000. The polymers are desirably liquid at room temperature, but can have a melting point up to about 80° C. Preferred polymers are hydroxyl functional telechelic, hydrogenated diene polymers containing 2 to 6 and preferably 2 to 4 hydroxy end groups per polymeric molecule (polymer unit).

The hydroxyl, carboxylic or amine terminated polyolefins are generally made from one or more olefins having from 2 to 6 carbon atoms such as ethylene, propylene, butylene, and the like. Such functional polyolefins can also be made by utilizing minor amounts (i.e., up to about 50 mole percent and preferably up to 20 mole percent) of ethylenically unsaturated comonomers such as styrene, vinyl toluene, alpha-methylstyrene, divinylbenzene, and similar aromatic monomers; or vinyl monomers, such as acrylonitrile, methacrylonitrile, vinylidene chloride, and similar aliphatic vinyl monomers; or hydroxyl functional ethylenically unsaturated monomers such as 2-hydroxy ethyl acrylate and methacrylate, 2-hydroxy propyl acrylate and methacrylate and similar hydroxy alkyl acrylates. Regardless of the type of polyolefin, it should contain either one or two hydroxyl groups per average molecule.

An especially preferred hydrogenated butadiene polymer is commercially available as Polytail H and Polytail HA sold by Mitsubishi Kasei Corp., and has

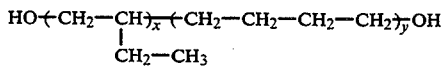

wherein X and Y are randomly distributed and the structure can contain additional —OH groups.

Still another class of the B block flexible polymer is the various mono- or di- hydroxyl, amine, or carboxyl terminated nitrile containing copolymers. These copolymers are prepared in accordance with conventional techniques well known to the art and to the literature and are generally made from one or more monomers of acrylonitrile or an alkyl derivative thereof with one or more conjugated dienes and optionally one or more monomers of acrylic acid, or an ester thereof. Examples of acrylonitrile monomers or alkyl derivatives thereof include acrylonitrile and alkyl derivatives thereof having from 1 to 4 carbon atoms such as methacrylonitrile, and the like. The amount of the acrylonitrile or alkyl derivative monomer is from about 1 percent to about 50 percent by weight and preferably from about 5 percent to about 35 percent by weight based upon the total weight of the nitrile containing copolymer.

The conjugated diene monomers generally have from 4 to 10 carbon atoms with from 4 to 6 carbon atoms being preferred. Examples of specific conjugated diene monomers include butadiene, isoprene, hexadiene, and the like. The amount of such conjugated dienes is generally from about 50 percent to about 99 percent by weight and preferably from about 55 percent to about 75 percent by weight based upon the total weight of the nitrile rubber forming monomers. Such mono or difunctional nitrile rubbers can be readily prepared generally containing either hydroxyl or carboxyl end groups and are known to the art and to the literature and are commercially available such as from The BFGoodrich Company under the trade name Hycar.

Yet another class of the B block flexible polymers is the various copolymers made from vinyl substituted aromatics having from 8 to 12 carbon atoms and conjugated diene monomers generally having from 4 to 12 carbon atoms, desirably from 4 to 8 carbon atoms, and preferably 4 or 5 carbon atoms. Examples of suitable aromatic monomers include styrene, alphamethyl styrene, and the like, with specific examples of conjugated dienes including hexadiene, isoprene, butadiene, and the like. A preferred copolymer is a random styrene butadiene copolymer. The amount of the vinyl substituted aromatic component, such as styrene, is generally from about one part to about 50 parts, and desirably from about 1 part to about 30 parts by weight, based upon the total weight of the copolymer. The preparation of such polymers having mono or di- hydroxyl, amine, or carboxyl terminated vinyl substituted aromatic conjugated diene copolymer are well known to the art and to the literature.

A still further class of the B block flexible polymers is the various polyethers which are either mono- or di-hydroxyl, amine, or carboxyl terminated. Such polyether polyols are generally made by reacting one or more alkylene oxides having from 2 to 10 carbon atoms such as propylene oxide with a strong base such as potassium hydroxide, preferably in the presence of water, glycols and so forth. Polyether polyols can also be made by ring-opening polymerization of tetrahydrofuran or epichlorohydrin using acid catalysts. Examples of polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia, or polyfunctional amines. The above mono- or di-hydroxyl, amine, or carboxyl terminated polyethers, as well as the preparation thereof, are well known to the art and are commercially available. Hydroxy terminated polytetrahydrofurans are commercially available as from DuPont as Terethane. Hydroxy terminated polypropylene oxides are commercially available as from Dow Chemical as Voranol and amine terminated polyethers are commercially available as from Texaco as Jeffamine.

Still another class of the B block flexible polymers is the various saturated polyesters made from aliphatic dicarboxylic acids or aliphatic anhydrides and glycols, and such are well known to the art and to the literature, as is the preparation thereof, and are commercially available. The aliphatic dicarboxylic acids and anhydrides have from 1 to 10 carbon atoms, with specific examples including carbonic acid, malonic acid, succinic, glutaric acid, adipic acid, pimelic acid, suberic acid, azelaic acid, sebacic acid, the anhydride counterparts thereof, and the like, with adipic acid generally being preferred. Optionally included within the above aliphatic dicarboxylic acids are minor amounts, that is up to about 40 percent by weight based upon a total weight of the acids, of an aromatic diacid such as phthalic acid, isophthalic acid, terephthalic acid, and the like. Mixtures of all of the above acids can be utilized as well. The glycols generally have from 2 to 15 carbon atoms with specific examples including ethylene glycol, propylene glycol, 1,3-butylene glycol, 1,4-butylene glycol, pentane diol, hexane diol, cyclohexanedimethanol dipropylene glycol, diethylene glycol, pinacol, and the like. Preferred glycols include diethylene glycol or a mixture of propylene glycol with ethylene glycol.

The polyester or A block is generally an unsaturated polyester having an average molecular weight of between 100 or 500 to 2,000 or 5,000 and has one, or less desirably two, functional end groups thereon such as hydroxyl, carboxyl, or amine. The polyesters are made by the copolymerization of generally cyclic ethers typically containing 2 or 3 carbon atoms in the ring and an unsaturated anhydride, as well as optional saturated anhydrides using double metal complex cyanide catalysts. Generally any cyclic oxide can be utilized such as 1,2-epoxides, oxetanes, and the like, with the cyclic ether having a total of up to 18 carbon atoms, as for example 2 carbon atoms in the ring and up to 16 carbon atoms in the side chains. Such cyclic oxide monomers can also contain one or more aliphatic double bonds and preferably only contain one aliphatic carbon to carbon double bond. Examples of suitable cyclic oxides include ethylene oxide (1,2-epoxy ethane), 1,2-propylene oxide, 1,2-butene oxide, 1,2-hexene oxide, 1,2-dodecane monoxide, isobutylene oxide, styrene oxide, 1,2-pentene oxide, isopentene oxide, 1,2-heptene oxide, allyl gylcidyl ether, isoheptene oxide, 1,2-octene oxide, methyl glycidyl ether, ethyl glycidyl ether, phenyl glycidyl ether, butadiene monoxide, isoprene monoxide, styrene oxide, tolyl glycidyl ether, 1,2-pentadecene oxide, epichlorohydrin, glycidoxypropyltrimethoxysilane, and the like. Generally, ethylene oxide, propylene oxide, and butylene oxide are preferred. Alkyl diols may be used instead of cyclic alkylene oxides. Said unsaturated polyester blocks may be polyester condensation reaction products of cyclic alkylene oxides or alkyl diols with dicarboxylic acids or their anhydrides.

Generally five-member cyclic anhydrides are preferred, especially those having a molecular weight between 98 and 400. Mixed anhydrides as well as mixtures of anhydrides may be used. Examples of preferred anhydrides include those of maleic, phthalic, itaconic, nadic, methyl nadic, hexahydrophthalic, succinic, tetrahydrophthalic, 1,2-naphthalenedicarboxylic, 1,2-tetrahydronaphthalene dicarboxylic acids, and the like. Further examples include such anhydrides in which hydrogen atoms have been substituted by halogen, hydroxyl or $C_{1-8}$ carbon atom alkyl, aryl or aralkyl groups such as the anhydrides of 3,4-dichlorophthalic, hexachlorodicycloheptadiene dicarboxylic (chlorendic), 8-hydroxyl-1,2-naphthalenedicarboxylic, 2,3-dimethyl maleic, 2-octyl-3-ethyl maleic, 4,5-dimethyl phthalic, 2-phenylethyl maleic, 2-tolyl maleic and the like.

As noted above, mixtures of saturated and unsaturated anhydrides can be utilized with generally maleic anhydride being preferred. Such polyesters are known to the art and to the literature and are generally made utilizing double metal cyanide complex catalysts. The method, preparation and scope of the various types of unsaturated polyesters which are suitable in the present invention are described in U.S. Pat. No. 3,538,043 which is hereby fully incorporated by reference with regard to all aspects thereof. For example, suitable catalysts for preparation of the polyester A block include zinchexacyanocobaltate and analogs thereof as well as various metalloporphyrins. Reaction temperatures generally include ambient to about 130° C. with from about 40° to about 80° C. being preferred. Such polyesters if made by utilizing maleic acid, can be isomerized with various conventional amines such as morpholine or piperidine to produce the fumarate isomer, as taught in U.S. Pat. No. 3,576,909, to Schmidle and Schmucker, which is hereby fully incorporated by reference with regard to all aspects thereof. Hydroxyl or carboxyl end groups are readily obtained by simply utilizing either an excess of the glycol or of the acid. Amine groups are added generally by post-reaction with an amine compound such as ethylene diamine, and the like. Such aspects are of course well known to the art and to the literature. Generally, such polyester A blocks have a significant molecular weight, as above 500. A preferred ester of the present invention is poly(propylenefumarate).

The monofunctional terminated unsaturated polyester A block is reacted with the B block flexible polymer to yield a block copolymer. If the flexible B block is monoterminated, an AB type block copolymer will be formed. If the flexible polymer B block is a diterminated functional polymer, an ABA type block copolymer will be formed. However, if a difunctional terminated polyester A block is utilized with a difunctional terminated flexible B block, an ABA type block copolymer is produced along with generally small amounts of an A(-BA)$_n$ type block copolymer where n is 2 to 5. Typically, such mixtures contain a majority amount, that is at least 50 percent and often at least 70, 80, or even 90 percent by weight of the ABA block copolymer.

When the flexible polymer B block is hydroxyl terminated, desirably the unsaturated polyester A block contains a monofunctional, or less desirably a difunctional, terminal acid end group so that an ester reaction occurs and an ester linkage is formed. Similarly, if the flexible polymer B block contains a carboxyl terminal group, the unsaturated polyester A block end group is desirably a hydroxyl so that an ester linkage can be formed. In either situation, a conventional esterification reaction is carried out in a manner well known to the art. The net result is the formation of an AB or an ABA block polymer and possible small amounts of A(BA)$_n$ block copolymer having an ester linkage between the blocks.

If the flexible B block is amine terminated, desirably the polyester A block has a monocarboxylic acid functional end group. Such a reaction is carried out in a conventional manner and results in an amide linkage. Alternatively, if the polyester A block is amine-terminated, a diisocyanate can be reacted with a mono- or di- hydroxyl terminated B block, so that the reaction product thereof with the amine-terminated A block results in a urea linkage.

Regardless of the type of linkage formed between the "A" block and the "B" block, the reaction conditions for forming such linkages are well known to the art and to the literature, and result in the formation of a novel block copolymer. Such reactions including the conditions thereof, etc., as well as the linkage reactions set forth hereinbelow are more fully defined in *Advanced Organic Chemistry, Reactions, Mechanisms, and Struc-*

*tures,* J. March, 2nd Edition, McGraw Hill, New York, N.Y., 1977, which is hereby fully incorporated by reference including subsequent editions thereof.

It is to be understood that the A and B type blocks are typically preformed polymers which are reacted together and that no in situ polymerization of the A block or the B block occurs. In other words, the present invention is desirably generally free of in situ polymerization or polymerization of one of the blocks on an existing block when the molecular weight of the A block is from about 500 or 600 to about 5,000.

It is also within the scope of the present invention to utilize a polyester A segment of very low molecular weight, such as for example from about 100 to about 500 or 600, wherein the ester segment or A block is merely the in situ reaction of a single or a few dicarboxylic anhydride and cyclic oxide molecules, such as maleic anhydride and propylene oxide. Preferably, the flexible B block is hydroxyl terminated. Such low molecular weight polyester A blocks result in a block copolymer having a high ratio or amount of the flexible polymer A block.

To prepare such low molecular weight A segments or blocks, it is advantageous to react the hydroxy terminated flexible B segment directly with the cyclic anhydride and propylene oxide. Suitable catalysts for the reaction include the double metal cyanide complex catalysts described above as well as the various titanates and alkyl substituted tin compounds like dibutyltin oxide. Preferred anhydrides for making such low molecular weight A segments have unsaturation such as maleic, tetrahydrophthalic, itaconic, nadic, methyl nadic and the like, although mixtures of unsaturated and saturated cyclic anhydrides may also be used. Generally, any cyclic oxide can be used with ethylene and propylene oxides being preferred.

According to the preferred embodiment of the present invention, the flexible polymer B block is hydroxyl terminated and is reacted with a monohydroxyl terminated unsaturated polyester A block through the utilization of a polyisocyanate to yield a block copolymer having a minimum molecular weight of 500 or 600. That is, a polyisocyanate is reacted with the hydroxyl end group of the flexible polymer B block thereby leaving a free isocyanate group which is subsequently reacted with the hydroxyl end group of the unsaturated polyester A block. Examples of polyisocyanates which can be utilized generally have the formula

R(NCO)$_n$ where n is generally about 2 (i.e. a diisocyanate) although it can be slightly higher or lower as when mixtures are utilized. R is an aliphatic having from about 2 to about 20 carbon atoms with from about 6 to about 15 carbon atoms being preferred or an aromatic including an alkyl substituted aromatic having from about 6 to about 20 carbon atoms, with from about 6 to about 15 carbon atoms being preferred, or combinations thereof. Examples of suitable diisocyanates include 1,6-diisocyanato hexane, 2,2,4-and/or 2,4,4-trimethyl hexamethylene diisocyanate, p-and m-tetramethyl xylene diisocyanate, dicyclohexylmethane-4,4'-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, (IPDI) isopropylene-bis-(p-phenyl isocyanate) and sulfone-bis-(p-phenyl isocyanate). Also useful are diisocyanates prepared by capping low molecular weight, that is less than 300, diols, ester diols or diamines with diisocyanates, such as the reaction products of one mole of 1,4-butanediol or bis-(4-hydroxylbutyl)succinate (molecular weight=262) with two moles of hexamethylene diisocyanate. TDI and IPDI are preferred for reasons set forth herein below. The reaction between the diisocyanate and the hydroxyl terminated flexible polymeric B block is carried out in an inert atmosphere such as nitrogen, at ambient temperatures and up to 30° C., desirably in the presence of urethane catalysts. Such catalysts are known to the art as well as to the literature and generally include tin compounds such as various stannous carboxylates, for example stannous acetate, stannous octoate, stannous laurate, stannous oleate and the like; or dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate and the like. Similarly, there can be used a trialkyltin hydroxide, dialkyltin oxide or dialkyltin chloride. As an alternative or in addition to the above tin compounds, various tertiary amines can be used such as triethylamine, benzyldimethylamine, triethylenediamine and tetramethylbutanediamine. The tin catalysts, when utilized, are generally used in amounts of 0.5 parts or less, i.e., in the range of about 0.01 to 0.5 parts, by weight per 100 parts of prepolymer. The tertiary amine catalysts, when utilized, can be used in amounts of 0.01 to about 5 parts by weight per 100 parts of prepolymer.

It is an important aspect of the present invention that the reaction of the diisocyanate with mono- or di- hydroxyl terminated flexible polymer B block occurs separately, that is, not in the presence of, in the absence of, or free from the mono- or di- hydroxyl functional unsaturated polyester A block. This ensures that a random copolymer containing block segments therein is not produced. Moreover, it is another important aspect of the present invention to utilize diisocyanates which have differential reaction rates with regard to the two isocyanate end groups. This is to ensure that only one of the groups reacts with the hydroxyl terminated flexible B block and the remaining unit generally remains unreacted until subsequent reaction of the monohydroxyl terminated polyester A block. For this reason, TDI and IPDI are preferred. The amount of the diisocyanate utilized is generally an equivalent mole amount to the mole amount hydroxyl groups in the flexible B block and thus is a ratio of diisocyanate to hydroxyl groups is from about 0.8 to about 1.2, and desirably from about 0.9 to about 1.1. Similarly, the amount of the polyester block A is generally an equivalent amount to the urethane linkages of the flexible B block, be it one linkage or two linkages per B block.

The mono- or di- hydroxyl terminated unsaturated polyester A block is then subsequently added to the vessel or solution containing the urethane terminated flexible polymer B block and reacted therewith in a conventional manner well known to the art and to the literature. The result is a urethane linkage between the polyester A block and the flexible polymer B block.

A distinct advantage of utilizing the urethane reaction route is that a low temperature reaction can be carried out which minimizes side reactions and that no unreacted compounds remain which have to be removed from the reaction product.

Another method of making a mixture of block copolymers containing a large amount of AB block copolymer is to react a diisocyanate-terminated flexible polymer B block having two free NCO groups thereon with an approximately equivalent amount of a low molecular weight alcohol and then subsequently reacting the product with an approximately equivalent amount of the functional terminated unsaturated polyester A block. The flexible polymer B block will contain a mixture of alcohol terminated end groups, unreacted urethane end groups, or both. The low molecular weight alcohol can be methanol, ethanol, n-propanol, isopropanol, t-butanol, and the like. In lieu of the low molecular weight saturated alcohol, a functional compound containing an ethylenically unsaturated polymerizable group can be utilized, such as hydroxy-styrene, hydroxy-ethyl-acrylate, methacrylate, or allyl alcohol.

Another preferred embodiment relates to the preparation of the low molecular weight A blocks which involves the reaction of hydroxyl terminated B blocks with a cyclic unsaturated anhydride and an alkylene oxide as noted above. Mixtures of saturated and unsaturated anhydrides can also be used.

Another aspect of the present invention is that the above-noted AB, or ABA, or $A(BA)_n$ block copolymers can be cured. Curing can occur utilizing conventional compounds such as ethylenically unsaturated compounds, for example vinyl or allyl compounds, and conventional free radical catalyst. Examples of ethylenically unsaturated compounds include styrene, a preferred compound, vinyl toluene, divinyl benzene, diallyl phthalate, and the like; acrylic acid esters and methacrylic acid esters wherein the ester portion is an alkyl having from 1 to 10 carbon atoms such as methylacrylate, ethylacrylate, n-butylacrylate, 2-ethyl-hexylacrylate, methyl methacrylate, ethylene glycol dimethacrylate, and the like. Other unsaturated monomers include vinyl acetate, diallyl maleate, diallyl fumarate, vinyl propionate, triallylcyanurate, and the like, as well as mixtures thereof. The amount of such compounds based upon 100 parts by weight of the block copolymers can generally vary from about 1 to about 500 parts by weight, and desirably from about 1 to about 100 parts by weight. The free radical initiators can include organic peroxides and hydroperoxides such as benzoyl peroxide, dicumyl peroxide, cumene hydroperoxide, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

The invention will be understood by reference to the following examples setting forth the preparation of unsaturated polyester-blocked flexible polymer compositions.

EXAMPLE 1

Poly(Propylene Fumarate)-b-Poly(Butadiene)-b-Poly(Propylene Fumarate) Triblock

In a 1-L resin kettle equipped with thermometer, heating mantle and stirring were charged 203 g (70 mmoles —OH) of BFG Hycar 2000x169 (a dihydroxy-terminated polybutadiene), 263 g of styrene, 15.7 g (141 mmoles total —NCO) of isophorone diisocyanate, 2.3 g of zinc stearate, and 1.4 g of DABCO T9 catalyst. The materials were mixed thoroughly under nitrogen and warmed to 70° C. After two hours 80 g (70 mmoles —OH) of a 80 percent solids in styrene solution of a mono-hydroxy unsaturated polyester (polypropylene fumarate, 850 MW) was added to the reaction mixture, along with 2.5 g of 10 percent benzoquinone in diallyl phthalate, and 0.5 g of DABCO T9 catalyst. The reaction mixture was cooled after three hours to room temperature, and the solution poured into a suitable container. The triblock had a flexible polymer to unsaturated polyester weight ratio of 3.2 to 1.0, and contained 50 percent solids in styrene.

EXAMPLE 2

Poly(Propylene Fumarate)-b-Poly(Butadiene-CO-Acrylonitrile)-Poly(-Propylene Fumarate) Triblock The above triblock was prepared by charging a 2-L resin kettle as above with 600 g (370 mmoles —OH) of Hycar 1300x34 (a dihydroxy-terminated poly(butadiene-CO-acrylonitrile, 26 percent AN content) and 480 g of styrene which was stirred overnight under nitrogen to dissolve. To the stirred solution was then added 52 g (600 mmoles total —NCO) of toluene diisocyanate, and 2.0 g DABCO T12 catalyst. The mixture was stirred for one-half hour during which time the temperature rose to 37° C., followed by the addition of 675 g (350 mmoles —OH) of an 80 percent solids in styrene solution of a mono-hydroxy unsaturated polyester (polypropylene fumarate, approx. 1600 MW). The mixture was kept at 37° C. with stirring for six hours, and then poured into a container. The triblock had a flexible polymer to unsaturated polyester weight ratio of 1.1 to 1.0, and contained 65 percent solids in styrene.

EXAMPLE 3

Poly(Propylene Fumarate)-b-Poly(Butadiene) Block Copolymer

The above block copolymer was prepared by charging 200 g (70 mmoles —OH) of Hycar 2000x169 to a 1-L resin kettle along with 234 g of styrene, 12.5 g (113 mmoles total —NCO) isophorone diisocyanate, 2.0 g of zinc stearate, and 2.0 g DABCO T9 catalyst. The starting materials were mixed thoroughly under nitrogen, and then heated to 70° C. After 90 minutes, 1.7 g (28 mmoles —OH) of n-propanol was added, and after 2.5 hours 36 g (32 mmoles) of an 80 percent solids in styrene solution of a monohydroxy unsaturated polyester (polypropylene fumarate, approx. 1400 MW). The mixture was stirred for another three hours, then cooled and transferred to a suitable container. The block copolymer had a flexible polymer to unsaturated polyester weight ratio of 7.0 to 1.0, and contained 53 percent solids in styrene. This composition was a mixture containing large amounts of an AB block copolymer.

EXAMPLE 4

Poly(Propylene Fumarate)-b-Poly(Butadiene-CO-Acrylonitrile) Block Copolymer

The above block copolymer was prepared in a 1-L resin kettle as above with a charge of 361 g (225 mmoles —OH) Hycar 1300x34 and 175 g (210 mmoles total —OH) of 80 percent solids in styrene solution of dihydroxy unsaturated polyester (polypropylene fumarate, approximately 1400MW), which were mixed thoroughly at 110° C. under vacuum for 90 minutes. The blend was cooled to 80° C. under nitrogen, and 21.6 g (250 mmoles total —NCO) of TDI added followed by stirring for ten minutes. DABCO T-12 catalyst (0.8 g) was added, causing an immediate increase in viscosity. Stirring was continued for one hour and the mixture cooled to 50° C. followed by the addition of 531 g of styrene. The solution was transferred to a suitable container. The flexible polymer to unsaturated polyester weight ratio of this additive was 2.6 to 1.0, and the solution contained 48 percent solids in styrene. This composition was a mixture containing $A(BA)_n$ block copolymers.

EXAMPLE 5

Poly(Propylene Fumarate)-b-Poly(Butadiene-co-Acrylonitrile) Block Copolymer

The above block copolymer was prepared by charging a 500-ml resin kettle with 189 g of a solution of Hycar 1300x31 (dicarboxy terminated polybutadiene-co-acrylonitrile, 10 percent AN content; 48.5 weight percent, 91.5 g, 51 mmoles carboxyl) and dihydroxy terminated polypropylene fumarate (1300 MW; 51.5 percent, 97.5 g, 150 mmoles —OH). The kettle was heated under vacuum at 150° to 160° C. for two hours to remove water. The product was transferred to a suitable container. The block copolymer had a flexible polymer to unsaturated polyester weight ratio of 0.9 to 1.0. This composition contained ABA block copolymers.

EXAMPLE 6

Poly(Propylene Fumarate)-b-Poly(Butadiene-co-Acrylonitrile) Block Copolymer

The above block copolymer was prepared by charging a 1.5-L resin kettle with 508 g (726 mmoles —OH) of unsaturated polyester (dihydroxy terminated polypropylene fumarate, approximately 1400 MW) 404 g (234 mmoles carboxyl of Hycar 1300x13 (dicarboxy terminated polybutadiene-co-acrylonitrile, 26 percent AN content), 0.4 g benzoquinone, and 0.4 g of triphenylphosphonium bromide. The mixture was stirred and heated to 150° C. under vacuum for four hours. After cooling to room temperature, 508 g of styrene was added and mixed to dissolve the polymer. The product was transferred to a suitable container. The block copolymer had a flexible polymer to unsaturated polyester ratio of 0.8 to 1.0, and contained 57 percent solids in styrene. This composition contained ABA block copolymers.

EXAMPLE 7

Poly(Propylene Fumarate)b-Poly(Tetrahydrofuran)-b-Poly(Propylene Fumarate) Triblock The above triblock was prepared by combining 400 grams of isocyanate-terminated poly(tetrahydrofuran 347 mmoles NCO), available from Air Products under the trademark PET90A, 312 grams of toluene, 3 grams of DABCO T9 ® catalyst, available from Air Products and Chemical Inc., and 224 grams of a solution of monohydroxy-terminated poly(propylene fumarate) (80 percent solids in styrene, 347 mmoles total —OH) in a one liter resin kettle equipped with nitrogen purge, a heating mantle, and a stirrer. The reagents were thoroughly mixed at room temperature under nitrogen, after which the contents were heated and maintained at 40° C. until the reaction was complete. The progress of the reaction was monitored using FTIR. Completion of the reaction was marked by the disappearance of the —NCO absorbance from the IR spectrum, at which time the product was cooled to room temperature. This triblock copolymer had a flexible polymer to unsaturated polyester ratio of approximately 2 to 1.

EXAMPLE 8

A Poly(Propylene Fumarate)-b-Poly(Butadiene)-b-Propylene Fumarate) Triblock

The above triblock was prepared by combining, in a one liter resin kettle equipped with nitrogen purge, heating mantle, and stirrer, 500 grams of hydroxy-terminated polybutadiene (137 mmoles total OH), available from the BFGoodrich Chemical Company under the trademark HYCAR 2000X169 ®, 310 grams of toluene, 31 grams of isophorone diisocyanate having 279 mmoles total —NCO, and 3 grams of DABCO T9 ® catalyst. The contents were thoroughly mixed under nitrogen, and then warmed to 60° C. for 2.5 hours. To the kettle were added 93 grams of a solution of monohydroxy-terminated poly(propylene fumarate) (80 percent solids in styrene, 144 mmoles total —OH), and 150 grams of toluene to reduce the viscosity. The contents were reacted for about 3 hours at 60° C. until the IR spectrum indicated complete consumption of —NCO. The product was then cooled to room temperature. This triblock copolymer had a flexible polymer to unsaturated polyester ratio of 6.2 to 1.0.

EXAMPLE 9

Hydroxypropylmaleate-b-Poly(Diethyleneadipate)-b-Hydroxypropylmaleate Triblock A 1-quart polymerization bottle was charged with 156.5 g (313 mmoles —OH) of Formrez 11-112 (a dihydroxy poly(diethylene adipate), available from Witco Chemical Co.), 30.7 g of maleic anhydride (313 mmoles), 124 g of toluene as solvent, and 0.3 g of tetrabutyl titanate catalyst. The bottle was sealed and heated in a waterbath to 80° C. On completion of the reaction of the maleic anhydride as determined by FTIR, 19.1 g of propylene oxide (329 mmoles) was charged to the bottle, and the reaction completed at 65° C. Determination of acid number and NMR indicated 100 percent maleic anhydride capping, and approximately 80 percent hydroxypropyl ester formation. This triblock copolymer had a flexible polymer to unsaturated polyester ratio of approximately 3.1 to 1.

EXAMPLE 10

Hydroxypropylmaleate-b-Poly(Propylene Adipate)-b-Hydroxypropylmaleate Triblock A 1-quart polymerization bottle was charged with 407.3 g (1.63 mmoles —OH) of Formrez 33-225 (a dihydroxy poly(propylene adipate), available from Witco Chemical Co.), 160.1 g maleic anhydride (1.63 mmoles), 153 g toluene as solvent, and 1.7 g of tetrabutyl titanate catalyst. The bottle was sealed and heated in a waterbath to 80° C. On completion of the reaction of the maleic anhydride as determined by FTIR, 94.7 g of propylene oxide (1.63 mmoles) was charged to the bottle, and the reaction completed at 65° C. Determination of acid number and NMR indicated 100 percent maleic anhydride capping, and approximately 80 percent hydroxypropyl ester formation. This triblock copolymer had a flexible polymer to unsaturated polyester ratio of approximately 1.6 to 1.

The above-identified diblock and triblock, etc., polyester-flexible polymer copolymers can be utilized as toughening agents in a variety of plastics such as unsaturated polyesters or vinyl ester resins. Moreover, they can be directly applied to a fiber structure and cured to coat the same and alleviate stress cracking on the surface of the fibers. Subsequently, the fiber structure coated with the cured polyester-flexible polymer block copolymers of the present invention can be utilized in various matrix formations such as in sheet molding coatings, in the preparation of sheet resins containing fiber reinforcement therein, in the preparation of fiber structures utilized in mats, nonwovens, wovens, and the like, in wet lay-up sheets, in resins utilized in injection molding, bulk molding, and the like.

DETAILED DESCRIPTION OF THERMOSETTING RESINS MODIFIED WITH BLOCK COPOLYMERS

The invention described herein addresses the deficiencies of SMC by providing a tougher matrix, one which has a greater elongation at failure while still retaining sufficient strength and modulus. The unsaturated polyester compositions modified with these flexible polymers can achieve high strength and elongation at 150° C., which is desirable to prevent damage during molding and coating baking processes. Toughness is commonly defined as the area contained under a stress-strain curve at a given point, in this case, failure. Although it is well known that toughness may be improved through a high elongation material with very low modulus, that is not acceptable for the contemplated uses of the unsaturated polyesters of this invention. Therefore, modulus must be substantially retained along with improved elongation to find usefulness as a molded material.

This improved strength and/or elongation to failure is achieved by incorporating one of the novel AB, ABA, or $A(BA)_n$ block copolymers of U.S. application Ser. No. 07/828,080 into an unsaturated polyester molding compositions such as sheet molding compounds, thick molding compounds, fiber reinforced polyesters, and resin transfer molding compounds. The block copolymers can be added to the other components in pure form or predissolved in ethylenically unsaturated monomers. The specification of U.S. application Ser. No. 07/828,080 is incorporated as the Detailed Description of this application providing support for making and characterizing these block copolymers.

One particularly preferred embodiment of this invention is to use monofunctional unsaturated polyesters as the A block made by the methods in U.S. Pat. No. 3,538,043, which is hereby fully incorporated by reference with regard to all aspects thereof. The polyesters of that invention can be isomerized with various conventional amines such as morpholine or piperidine to produce fumarate isomer, as taught in U.S. Pat. No. 3,576,909 to Schmidle and Schmucker, which is hereby fully incorporated by reference with regard to all aspects thereof. These mono-hydroxy terminated polyesters can be used as one A block in the AB, ABA or $A(BA)_n$ block copolymers. An important aspect of these two patents is the ability to make monofunctional unsaturated polyesters which in turn limits the molecular weight and architecture of the block copolymers to AB or ABA depending on whether the B block is monofunctional or difunctional in these reactions.

Another particularly preferred embodiment is a B block made from a saturated polyester made predominately from aliphatic dicarboxylic acids or aliphatic anhydrides and glycols or from ring-opening polymerization of cyclic lactones. These polyesters from cyclic lactones would have from 3 to 6 carbon atoms per repeat unit. These B blocks can be of about 500 to about 5000, desirably about 500 to about 2,000 or 3,000, and preferably about 500 to about 1500 molecular weight. The dicarboxylic acids or their anhydride components can include up to 30 or 40 weight percent, based on the weight of all the dicarboxylic acids and their anhydrides in the B block, of aromatic dicarboxylic acids or their anhydrides. In a preferred embodiment, the A block is made by an in situ reaction of the unsaturated polyester precursor molecules with the already formed saturated polyester B block as described in the Detail Description. In this embodiment with in situ reaction, the average molecular weight of the A blocks is about 100 to about 500 or 600.

Another embodiment is the use of a saturated polyester B block along with an unsaturated polyester A block or blocks wherein the A blocks have average molecular weights above 600 or from 601 or 610 to about 5,000, and desirably from 601 or 610 to about 2,000.

Another embodiment is the use of rubbery B blocks made by chain mechanism polymerization or copolymerization of unsaturated monomers through their carbon-carbon double bonds or ring-opening polymerization of cyclic ethers having 2 to 10 carbon atoms, such as dienes, olefins, various vinyl monomers, and cyclic alkylene oxides as described in the above Detailed Description, resulting in Tg of 0° C. or less. These chain mechanism polymerizations are contrasted with step condensation polymerizations in chapter 3 of George Odians *Principles of Polymerization*, 2nd Ed, Wiley-Interscience: New York, 1981. The use of the term chain mechanism polymerization allows the author to distinguish polyesters which are flexible polymers from most other flexible polymers and desirably exclude them when the A block has a molecular weight of 600 or less. The polymers from chain mechanism thus includes all of the B block polymers except for the polyesters.

Another preferred embodiment is the use of monofunctionally terminated unsaturated polyester blocks A. The procedures to make these are detailed in the above Detailed Description. These monofunctionally terminated A blocks when reacted with monofunctional B blocks limit the block copolymers to AB structures. When monofunctional A blocks are reacted with difunctional B blocks under controlled conditions, the block copolymers sizes are limited to ABA copolymers as the largest units. Crosslinked or high molecular weight block copolymers of prior art are minimized.

Unsaturated polyester compositions as used in this specification refers to compositions of unsaturated polyester resins, ethylenically unsaturated monomers, optional low profile additives, and free radical generating molecules. The composition can be filled with various organic and inorganic fillers and reinforced with fibers.

Preferred unsaturated polyester compositions are described by E. Melby and J. Castro entitled "Glass-Reinforced Thermosetting Polyester Molding: Materials and Processing" in volume 7 of *Comprehensive Polymer Science* published by Pergamon Press: Oxford, 1989, pp 51–109, which is hereby fully incorporated by reference.

Preferred amounts of the various components in a polyester molding composition is best expressed in parts by weight. These will be based upon 100 parts by weight of the ethylenically unsaturated monomers and the unsaturated polyester resin or vinyl ester resin. The amounts specified below and in the claims will be amounts by weight of the chemical compound and will not include solvents or diluents unless otherwise noted.

The unsaturated polyester or vinyl ester resin is desirably from about 25 to about 60 parts, and preferably from about 35 to about 50 parts by weight. The ethylenically unsaturated monomer is desirably from about 40 to about 75 parts, and preferably from about 40 to about 65 parts by weight. The low profile additive is desirably present up to 40 parts and preferably from about 10 to about 30 parts by weight. The above parts by weight are based on 100 parts total weight of the unsaturated polyester or vinyl ester resin and the ethylenically unsaturated monomers.

The AB, ABA, or A(BA)$_n$ block copolymers can be present from about 1 to about 50 parts, desirably from about 5 to about 40 parts, and preferably from about 10 to about 30 parts by weight based upon 100 parts by weight of the unsaturated polyester resin or vinyl ester resin and ethylenically unsaturated monomers. With the preferred ratios of B block to A blocks, this would yield a final unsaturated polyester composition with from about 1 to about 49 parts B block, desirably from about 5 to about 38 parts B block, and preferably from about 10 to about 28 parts by weight B block.

Suitable unsaturated polyester resins which can be utilized in the polyester molding composition are well known to the art and to the literature and include products of the condensation reaction of low molecular weight diols (that is, diols containing from 2 to 12 carbon atoms and desirably from 2 to 6 carbon atoms) with dicarboxylic acids or their anhydrides containing from 3 to 12 carbon atoms and preferably from 4 to 8 carbon atoms provided that at least 50 mole percent of these acids or anhydrides contain unsaturation. Examples of diols include 1,2-propylene glycol, ethylene glycol, 1,3-propylene glycol, diethylene glycol, di-1,2-propylene glycol, 1,4-butanediol, neopentyl glycol, and the like. A preferred diol is 1,2-propylene glycol. Mixtures of diols may also be advantageously used. Preferred acids include fumaric acid, maleic acid, whereas preferred anhydrides include maleic anhydride. Often, mixtures of acids and/or anhydrides are utilized with the preferred acids or anhydrides and such compounds include phthalic anhydride, terephthalic acid, isophthalic acid, adipic acid, glutaric acid, and the like. The condensation reactions are catalyzed by compounds such as organotitanates and organo tin compounds such as tetrabutyl titanate or dibutyl tin oxide, and the like.

Various other types of unsaturated polyesters can be utilized. Another type is described in R. J. Herold U.S. Pat. No. 3,538,043, which is hereby fully incorporated by reference. Typically, the polyesters are made by interpolymerization of maleic anhydride with oxiranes substituted with alkyls containing from 0 to 4 carbon atoms. Examples of oxiranes include ethylene oxide, propylene oxide, and butylene oxides. In addition to maleic anhydride, other anhydrides can be utilized in amounts up to 50 mole percent (i.e., from 0 to 50 mole percent) of the total anhydride charge, wherein said anhydride has from 4 to 10 carbon atoms, such as phthalic anhydride, nadic anhydride, methyl nadic anhydride, tetrahydrophthalic anhydride, succinic anhydride, and cyclohexane-1,2-dicarboxylic acid anhydride. The molar ratio of oxirane to anhydride can be from about 1.0 to about 2.0, and preferably from about 1.0 to about 1.3. An excess of oxirane is preferred in the preparation of the polyesters so that the final product has a low content of carboxylic acid end groups and a high content of hydroxyl end groups.

In the preparation of the unsaturated polyesters from oxiranes and anhydrides, small amounts of initiators are utilized as from about 5 to about 30 parts by weight per 100 parts by weight of the polyester forming monomers. Examples of specific initiators include polyols, for example diols, triols, tetrols, having from 2 to 12 carbon atoms, or dicarboxylic acids containing from 3 to 10 carbon atoms, as for example fumaric acid, succinic acid, glutaric acid, and adipic acid. The molecular weight of the polyol is generally less than 500, preferably less than 200. Diols and dicarboxylic acid initiators result in linear, difunctional polyester chains with an average of two hydroxyl end groups per polymer chain. Triols produce polyester chains with an average of 3 arms and 3 hydroxyl end groups, and tetrols result in 4 arm chains with 4 hydroxyl end groups. Various catalysts can be utilized such as a zinc hexacyano cobaltate complex, with the like, as described in U.S. Pat. No. 3,538,043 which is hereby fully incorporated by reference.

Regardless of whether an unsaturated polyester made from an oxirane or a diol is utilized, the molecular weight thereof is from about 500 to about 10,000 and preferably from about 1,000 to about 5,000.

Another important component is an ethylenically unsaturated monomer or crosslinking agent such as a polymerizable vinyl or allyl compound, such as a vinyl substituted aromatic having from 8 to 12 carbon atoms, as for example styrene, a preferred monomer, vinyl toluene, divinyl benzene, diallyl phthalate, and the like; acrylic acid esters and methacrylic acid esters wherein the ester portion is an alkyl having from 1 to 10 carbon atoms such as methyl acrylate, ethyl acrylate, and the like; and other unsaturated monomers including vinyl acetate, diallyl maleate, diallyl fumarate, and the like. Mixtures of the above compounds can also be utilized. The preferred ethylenically unsaturated monomer is styrene and mixtures of styrene and other monomers where styrene is at least 50 weight percent, desirably 75 weight percent, and preferably 85 weight percent of the ethylenically unsaturated monomers.

Fibers can be added to the composition for added strength and stiffness. Examples of fibers which can be utilized in this invention generally include any reinforcing fiber such as glass, aramid, nylon, polyester, graphite, boron, and the like. Fiber structure suitable for incorporation into the matrix include generally individual fibers, various types of woven fibers, or any general type of nonwoven fibers. Included within the woven class is any general type of woven fabrics, woven roving, and the like. Generally included within the nonwoven class is chopped strands, random or wound continuous filaments or rovings, reinforcing mats, nonreinforcing random mats, fiber bundles, yarns, nonwoven fabrics, etc. Coated fiber bundles, comprising about 5 to about 50 or 150 strands, each having about 10 to about 50 fibers, highly bonded together with a conventional sizing agents such as various amino silanes, are preferred. Chopped glass fibers are preferred with a desirable length of 0.5" to 2.0" and preferably 1".

The fiber structure may be randomly distributed within the matrix or be arranged in selected orientations such as in parallel or cross plies or arranged in mats or woven fabrics, etc. The fibers may comprise from about 5 percent up to about 85 percent by weight of the composite and preferably from 20 percent to 50 percent by weight of the composite. The specific quantity of fiber structure in the composite can be varied consistent with the physical properties desired in the final composite molded article.

Optionally, various other components or additives can be utilized to form the molding compound composition. For example, various thermoplastic polymers (low profile or low shrinkage additives) can be utilized. Typical low profile additives are well known and include polyvinyl acetate, saturated polyesters, polyacrylates or polymethacrylates, saturated polyester urethanes, and the like.

Other additives which can also be utilized are known to the art and to the literature and include internal mold release agents such as zinc stearate; viscosity reducers and viscosity modifiers; free radical inhibitors; mineral fillers such as calcium carbonate, Dolomite, clays, talcs, zinc borate, perlite, vermiculite, hollow glass, solid glass microspheres, hydrated alumina, and the like. The mold release agent and viscosity modifiers are used in effective amounts. The typical viscosity reducers used in this specification are long chain aliphatic monocarboxylic acids or saturated polyesters with acid groups. The viscosity modifiers include compounds such as MgO which thicken the sheet molding compounds. These are also called maturation agents. The fillers can be present from 0 to about 80 weight percent, and desirably from 20–70 weight percent of the total composition weight. Free radical inhibitors are included to modify cure cycles by providing cure delay and moderating the cure exotherm. These free radical inhibitors can be present from 0.001 to 0.2 parts per 100 parts by weight polymers and resins in the composition. The free radical inhibitors include benzoquinone, hydroquinone, and similar substituted quinones.

In addition to unsaturated polyesters, other suitable matrix materials include vinyl ester resins. The general structure of a typical vinyl ester resin, whose size can vary depending on the number of monomer units, is given by the formula below, wherein n is desirably 1, 2, or 3 and is preferably 1.

Conventional catalysts can be used to cure the composition. Examples of such catalysts for the cure of unsaturated polyester or vinyl ester resins include organic peroxides and hydroperoxides such as benzoyl peroxide, dicumyl peroxide, cumene hydroperoxide, tert-butylperbenzoate, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like. When curing is done in a mold at elevated temperatures, then the temperature can desirably vary from about 30° C. to about 160° C. and is preferably from about 80° C. to about 150° C. Alternatively, when photo sensitive agents are used, lower temperatures can be used. The amount of catalyst used can vary from about 0.1 to about 5 parts and is desirably 0.5 to about 2.0 parts by weight per 100 parts of resins and polymer forming components in the composition.

The general procedure for mixing the polyester networks involves dissolving the unsaturated polyester; the AB, ABA, and $A(BA)_n$ block copolymers, and the other polymeric components in the ethylenically unsaturated monomers. The composition is then well mixed. The catalyst for the free radical crosslinking reaction can be added to the mix at any of the various stages so long as the temperature of the mix is not so high as to start free radical crosslinking. Fillers, fibers, inhibitors, and maturation agents can also be added at this stage.

The above AB, ABA, and $A(BA)_n$ block copolymers are particularly desirable over prior art modifications of unsaturated polyester compositions because they minimize increases in the SMC paste viscosity. Desirably paste viscosities for SMC formulations and manufacture are on the order of 15,000 to 25,000 cps at 35° C. Addition to the SMC paste of high molecular weight resins or resin backbones which increase paste viscosity significantly above 50,000 cps at 35° C. can create undesirable effects on mechanical properties and molded surface quality.

The B blocks of these block copolymers can phase separate during curing of the unsaturated polyester composition. This frequently occurs with the polybutadiene polymers and the butadiene-acrylonitrile copolymers. The polyether B blocks phase separate on curing if they are higher molecular weight. The polyester B blocks are generally soluble in the unsaturated polyester resin compositions and do not phase separate to create separate domains.

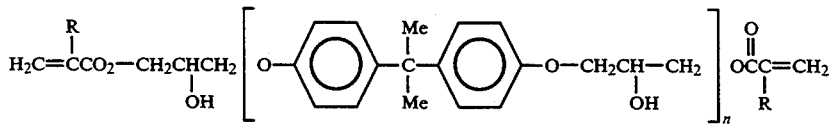

and wherein R is a hydrogen atom or an alkyl group. Vinyl ester resins are prepared by reacting epoxy resins such as the addition products of 1-chloro-2,3-epoxypropane with 2,2'-bis(4-hydroxyphenyl)propane with either methacrylic or acrylic acid. The terminal unsaturation can be crosslinked with styrene in the same fashion as an unsaturated polyester. These vinyl ester resins can be used as a partial or full replacement for the unsaturated polyester resin previously specified.

Compositions made in accordance with the invention can be utilized in wet layup, resin transfer molding, filament winding, bulk molding, sheet molding, thick molding, and the like. The composite material of the invention provides a toughened molding material having better crack resistance (i.e., higher strain to failure) and can be molded into automotive body panels, automotive structural components, grille and headlamps assemblies, hoods, doors, food trays, machine covers and guards, bathroom components, aircraft components, various electrical and household components, sporting goods, etc.

The AB, ABA, and A(BA)$_n$ block copolymers of the Detail Description were formulated into SMC compounds below and the various physical properties were evaluated. The flexural properties were evaluated with ASTM D790 while the tensile properties were evaluated with ASTM D638-89. The compositions are reported first without reinforcing fibers as this simplifies the interpretation of physical tests and gives a true representation of the filled matrix performance. In Table 7, the physical properties of fiber reinforced samples are shown for formulations 10 and 11. For ease of handling, many of the SMC components are commercially prepared as solutions in styrene and are labelled indicating the weight percent of the component and styrene.

FORMULATION 2

Poly(propylene fumarate)-b-poly(butadiene)-b-poly(propylene fumarate) from Example 1 was formulated into a filled SMC using the recipe in Table 1. This ABA block copolymer is basically a 5800 MW rubbery butadiene block with two 850 MW propylene fumarate end blocks.

FORMULATION 3

Poly(propylene fumarate)-b-poly(butadiene-co-acrylonitrile)-b-poly(propylene fumarate) of Example 2 was formulated into a filled SMC using the recipe in Table 1. This ABA block copolymer is basically a 3240 MW rubber butadiene-acrylonitrile block with two 1600 MW propylene fumarate end blocks.

TABLE 1

| FORMULATIONS 1, 2, AND 3 | | | |
|---|---|---|---|
| Formulation | 1 | 2 | 3 |
| Unsaturated Polyester Resin A | 139.0 | 136.0 | 130.6 |
| Low Profile Additive A in Styrene | 133.0 | 133.0 | 133.0 |
| Modifier of Example 1 | — | 17.2 | — |
| Modifier of Example 2 | — | — | 18.0 |
| Styrene | 30.0 | 15.8 | 20.4 |
| 10% Benzoquinone/Diallyl Phthalate | 1.0 | 1.0 | 1.0 |
| Tertiary Butyl Peroxy Benzoate | 4.5 | 4.5 | 4.5 |
| Zinc Stearate | 4.5 | 4.5 | 4.5 |
| Viscosity Reducer A | 9.0 | 9.0 | 9.0 |
| CaCO$_3$ | 665.0 | 665.0 | 665.0 |
| 35% MgO Dispersion | 14.0 | 14.0 | 14.0 |
| TOTAL: | 1000.0 | 1000.0 | 1000.0 |

Unsaturated Polyester Resin A is of MW approximately 1200–1600 made from propylene and other diols and fumaric acid. It is 65 wt. percent polyester and 35 wt. percent styrene. It is commercially available.
Viscosity Reducer A is one of the commercially available ones listed in the specification.
Low Profile Additive A is of the polyester-urethane type. It is 40 wt % resins and 60 wt % styrene. (It was commercially available at the time of the experiments).
The 35% by wight Mgo dispersion is MgO in styrene with a small amount of carrier resins.

TABLE 2

| PHYSICAL PROPERTIES OF MOLDED SAMPLES, FORMULATIONS 1, 2, AND 3 | | | |
|---|---|---|---|
| Formulation | 1 (Control) | 2 | 3 |
| Rubber Content parts/hundred UPE | 0 | 6.5 | 6.5 |
| Flexural (23° C.) | | | |
| Modulus (Mpsi) | 0.63 | 0.60 | 0.65 |
| Strength (psi) | 4450 | 4500 | 4400 |

TABLE 2-continued

| PHYSICAL PROPERTIES OF MOLDED SAMPLES, FORMULATIONS 1, 2, AND 3 | | | |
|---|---|---|---|
| Formulation | 1 (Control) | 2 | 3 |
| Strain (%) | 1.00 | 1.00 | 1.00 |
| Rel. Flexural Toughness | 1.00 | 1.05 | 0.95 |
| Tensile (150° C.) | | | |
| Strength (psi) | 790 | 950 | 825 |
| Elongation (%) | 2.60 | 2.86 | 2.96 |
| Rel. Toughness | 1.00 | 1.03 | 1.07 |

The physical properties of the compositions of Formulations 2 and 3 using the block copolymers of Example 1 and 2 are shown in Table 2. The most dramatic improvements are in the Tensile (150° C.) properties where the strength, elongation and energy to failure all increased.

FORMULATIONS 5, 6, 8 AND 9

Poly(propylene fumarate)-b-poly(butadiene) copolymer of Example 3 was formulated into a filled polyester composition according to the recipes shown in Tables 3 and 5. This copolymer is basically a 4000 MW rubbery butadiene block with one 1400 MW propylene fumarate end block. The physical properties of these two different unsaturated polyester compositions are shown in Tables 4 and 6. The Tensile (150° C.) properties using different amounts of modifier in formulations 5, 6, 8, and 9, showed a dramatic improvement in strength, elongation, and relative energy at failure in both Tables 4 and 6.

TABLE 3

| FORMULATIONS 4, 5, and 6 | | | |
|---|---|---|---|
| Formulation | 4 (Control) | 5 | 6 |
| Unsaturated Polyester Resin A | 139.0 | 134.8 | 136.6 |
| Low Profile Additive A | 133.0 | 133.0 | 133.0 |
| Modifier of Example 3 | — | 32.6 | 13.0 |
| Styrene | 30.0 | 5.5 | 23.3 |
| 10% Benzoquinone/Diallyl Phthalate | 1.0 | 1.0 | 1.0 |
| Tertiary Butyl Peroxy Benzoate | 4.5 | 4.5 | 4.5 |
| Zinc Stearate | 4.5 | 4.5 | 4.5 |
| Viscosity Reducer A | 9.0 | 9.0 | 9.0 |
| CaCO$_3$ | 665.0 | 665.0 | 665.0 |
| 35 wt % MgO Dispersion | 14.0 | 14.0 | 14.0 |
| TOTAL: | 1000.0 | 1000.0 | 1000.0 |

TABLE 4

| PHYSICAL PROPERTIES OF MOLDED SAMPLES, FORMULATIONS 4, 5, AND 6 | | | |
|---|---|---|---|
| Formulation | 4 (Control) | 5 | 6 |
| Rubber Content parts/hundred UPE | 0 | 16.8 | 6.7 |
| Flexural (23° C.) | | | |
| Modulus (Mpsi) | 0.55 | 0.52 | 0.55 |
| Strength (psi) | 3812 | 3600 | 3930 |
| Strain (%) | 1.00 | 1.00 | 1.00 |
| Rel. Flexural Toughness | 1.00 | 0.90 | 1.14 |
| Tensile (150° C.) | | | |
| Strength (psi) | 660 | 745 | 720 |
| Elongation (%) | 1.60 | 1.77 | 1.78 |
| Relative | 1.00 | 1.27 | 1.14 |

TABLE 4-continued

PHYSICAL PROPERTIES OF MOLDED SAMPLES, FORMULATIONS 4, 5, AND 6

| Formulation | 4 (Control) | 5 | 6 |
|---|---|---|---|
| Toughness | | | |

TABLE 5

FORMULATIONS 7, 8, AND 9

| Formulation | 7 (Control) | 8 | 9 |
|---|---|---|---|
| Unsaturated Polyester Resin B | 132.0 | 118.7 | 129.4 |
| Low Profile Additive B | 88.5 | 79.6 | 86.7 |
| Modifier of Example 3 | — | 50.6 | 10.2 |
| Styrene | 35.5 | 8.3 | 30.0 |
| Divinylbenzene | 12.5 | 11.3 | 12.3 |
| 10% Benzoquinine/Diallyl Phthalate | 0.5 | 0.5 | 0.5 |
| Tertiary Butyl Peroxy Benzoate | 2.5 | 2.5 | 2.5 |
| Zinc Stearate | 10.0 | 10.0 | 10.0 |
| Viscosity Reducer B | 8.0 | 8.0 | 8.0 |
| CaCO3 | 697.0 | 697.0 | 697.0 |
| 35 wt % MgO Dispersion | 13.5 | 13.5 | 13.5 |
| TOTAL: | 1000.0 | 1000.0 | 1000.0 |

Unsaturated Polyester Resin B is of MW approximately 1200–1600 made from propylene and other diols and fumaric acid. It is 65% by weight polyester and 35% by weight styrene. It is commercially available.
Viscosity Reducer B is one of those listed in the specification and is commercially available.
Low Profile Additive B is of the polyvinylacetate type. It is 40 wt % resin and 60 wt % styrene. It is commercially available.

TABLE 6

PHYSICAL PROPERTIES OF MOLDED SAMPLES, EXAMPLE 13 FORMULATED IN TABLE 5

| Formulation | 7 (Control) | 8 | 9 |
|---|---|---|---|
| Rubber Content, parts/hundred UPE | 0 | 29.0 | 5.6 |
| Flexural (23° C.) | | | |
| Modulus (Mpsi) | 0.82 | 0.83 | 0.89 |
| Strength (psi) | 5110 | 5490 | 6070 |
| Strain (%) | 0.84 | 0.93 | 0.93 |
| Rel. Flexural Toughness | 1.00 | 1.21 | 1.32 |
| Tensile (150° C.) | | | |
| Strength (psi) | 697 | 854 | 775 |
| Elongation (%) | 1.04 | 1.08 | 1.20 |
| Relative Toughness | 1.00 | 1.86 | 1.23 |

FORULATION 11

Poly(propylene fumarate)-b-poly(butadiene-co-acrylonitrile) copolymer from Example 4 was formulated into the filled SMC recipe of Table 7. This block copolymer is assumed to be AB type with a 3200 MW butadiene rubbery block and a 1400 MW propylene fumarate block. This example was further modified to contain 30 weight percent one inch chopped glass fiber based on the total composition weight. The fibers contribute significantly to the Tensile properties as shown in Table and mask the effects of the AB copolymer. The Flexural properties of Formulation 11 at 23° C. and 150° C., however, now shows the benefits of the rubbery segments by its increased modulus and strength.

TABLE 7

FORMULATIONS FOR EXAMPLE 14

| Formulation | 10 (Control) | 11 |
|---|---|---|
| Unsaturated Polyester Resin C | 1517 | 1348 |
| Low Profile Additive C | 930 | 930 |
| Modifier of Example 4 | — | 367 |
| Styrene | 73 | — |
| 10% Benzoquinone/Diallyl Phthalate | 2.5 | 2.5 |
| Tertiary Butyl Peroxy Benzoate | 38.0 | 38.0 |
| Zinc Stearate | 101.0 | 101.0 |
| CaCO3 | 4914.0 | 4914.0 |
| 35 wt % MgO Dispersion | 38.0 | 38.0 |
| TOTAL: | 7613.5 | 7738.5 |

Unsaturated Polyester Resin C is of approximately 1200–1600 molecular weight made from propylene and other diols and fumaric acid. It is 65% by weight polyester and 35% by weight styrene.
Low Profile Additive C is of the polyvinyl acetate type and is commercially available. It is approximately 40 wt % resin and 60 wt % styrene.

TABLE 8

PHYSICAL PROPERTIES OF MOLDED SMC EXAMPLE 14 FORMULATED IN TABLE 7

| Formulation | 10 (Control) | 11 |
|---|---|---|
| Rubber Content, parts/hundred UPE | 0 | 13.8 |
| Flexural (23° C.) | | |
| Modulus (Mpsi) | 1.82 | 1.93 |
| Strength (psi) | 30,850 | 34,019 |
| Flexural (150° C.) | | |
| Modulus (Mpsi) | 0.89 | 1.04 |
| Strength (psi) | 11,110 | 13,505 |
| Tensile (23° C.) | | |
| Strength (psi) | 11,860 | 12,000 |
| Elongation (%) | 1.90 | 1.60 |
| Tensile (150° C.) | | |
| Strength (psi) | 5659 | 4364 |
| Elongation (%) | 1.05 | 1.03 |

FORMULATIONS 13 AND 14

Poly(propylene fumarate)-b-poly(butadiene-co-acrylonitrile) copolymer from Example 5 was formulated into a filled SMC using the recipe of Table 9. This ABA triblock is basically a dicarboxy terminated 3600 MW butadiene-acrylonitrile reacted with two 1300MW propylene fumarate end blocks. In Table 10 formulations 13 and 14 having different amounts of modifier in this unsaturated polyester composition showed higher Flexural strength at 23° C., higher Flexural modulus and strength at 150° C., higher Tensile strength at 23° C., and higher Tensile modulus and strength at 150° C.

TABLE 9

FORMULATIONS 12, 13, AND 14

| Formulation | 12 (Control) | 13 | 14 |
|---|---|---|---|
| Unsaturated Polyester Resin C | 189.0 | 127.0 | 158.0 |
| Low Profile Additive C | 111.0 | 111.0 | 111.0 |
| Modifier of Example 5 | — | 62.0 | 31.0 |
| 10% Benzoquinone/Diallyl Phthalate | 0.3 | 0.3 | 0.3 |
| Tertiary Butyl Peroxy Benzoate | 4.5 | 4.5 | 4.5 |
| Zinc Stearate | 12.0 | 12.0 | 12.0 |
| CaCO3 | 585.0 | 585.0 | 585.0 |
| 35 wt % MgO Dispersion | 3.0 | 3.0 | 3.0 |

TABLE 9-continued

FORMULATIONS 12, 13, AND 14

| Formulation | 12 (Control) | 13 | 14 |
|---|---|---|---|
| TOTAL: | 904.8 | 904.8 | 904.8 |

TABLE 10

PHYSICAL PROPERTIES OF MOLDED SAMPLES, FORMULATIONS 12, 13, AND 14

| Formulation | 12 (Control) | 13 | 14 |
|---|---|---|---|
| Rubber Content parts/hundred UPE | 0 | 25.5 | 12.3 |
| Flexural (23° C.) | | | |
| Modulus (Mpsi) | 0.90 | 0.83 | 0.89 |
| Strength (psi) | 5343 | 6341 | 6652 |
| Flexural (150° C.) | | | |
| Modulus (Mpsi) | 0.10 | 0.13 | 0.15 |
| Strength (psi) | 1244 | 1520 | 1685 |
| Tensile (23° C.) | | | |
| Strength (psi) | 2615 | 2758 | 2940 |
| Elongation (%) | 0.40 | 0.40 | 0.50 |
| Tensile (150° C.) | | | |
| Strength (psi) | 619 | 945 | 853 |
| Elongation (%) | 1.10 | 1.20 | 1.30 |

FORMULATION 16

Poly(propylene fumarate)-b-poly(butadiene-co-acrylonitrile) copolymer of Example 6 was formulated into a filled unsaturated polyester composition using the recipe of Table 11. This ABA triblock copolymer is basically 3500 MW rubber butadiene-acrylonitrile block with two 1400 MW propylene fumarate end blocks. The physical properties of this formulation 16 is shown in Table 12. The Tensile strength and elongation at 150° C. shows the most dramatic improvements.

TABLE 11

FORMULATIONS 15 AND 16

| Formulation | 15 (Control) | 16 |
|---|---|---|
| Unsaturated Polyester Resin C | 1517 | 1348 |
| Low Profile Additive C | 930 | 930 |
| Modifier of Example 6 | — | 446 |
| 10% Benzoquinone/Diallyl Phthalate | 2.5 | 2.5 |
| Tertiary Butyl Peroxy Benzoate | 38.0 | 38.0 |
| Zinc Stearate | 101.0 | 101.0 |
| CaCO₃ | 4914.0 | 4914.0 |
| 35 wt % MgO Dispersion | 38.0 | 38.0 |
| TOTAL: | 7540.5 | 7540.5 |

TABLE 12

PHYSICAL PROPERTIES OF MOLDED SAMPLES, FORMULATIONS 15 AND 16

| Formulation | 15 (Control) | 16 |
|---|---|---|
| Rubber Content parts/hundred UPE | 0 | 11.7 |
| Flexural (23° C.) | | |
| Modulus (Mpsi) | 0.88 | 0.86 |
| Strength (psi) | 5142 | 4594 |
| Flexural (150° C.) | | |
| Modulus (Mpsi) | 0.13 | 0.12 |
| Strength (psi) | 1256 | 1397 |
| Tensile (23° C.) | | |
| Strength (psi) | 3864 | 4231 |

TABLE 12-continued

PHYSICAL PROPERTIES OF MOLDED SAMPLES, FORMULATIONS 15 AND 16

| Formulation | 15 (Control) | 16 |
|---|---|---|
| Elongation (%) | 0.72 | 0.93 |
| Tensile (150° C.) | | |
| Strength (psi) | 783 | 966 |
| Elongation (%) | 1.50 | 1.95 |

TABLE 13

| Formulation | 17 (Control) | 18 20% Sub | 19 20% Sub | 20 10% Sub | 21 20% Sub |
|---|---|---|---|---|---|
| Component | | | | | |
| Unsaturated Polyester Resin B | 157.5 | 126.0 | 126.0 | 141.8 | 121 |
| Modifier of Example 9 | — | 59.5 | — | — | |
| Modifier of Example 10 | — | — | 59.5 | 29.7 | 58.5 |
| Low Profile Additive B | 109.5 | 87.6 | 87.6 | 98.6 | 64.5 |
| Styrene | 16.5 | 13.2 | 13.2 | 14.8 | 40.0 |
| Divinylbenzene | 14.0 | 11.2 | 11.2 | 12.6 | 13.5 |
| 10% Benzoquinone/Diallyl Phthalate | 1.0 | 1.0 | 1.0 | 1.0 | 1.0 |
| Tertiary Butyl Perbenzoate | 3.0 | 3.0 | 3.0 | 3.0 | 3.0 |
| Lupersol 256 Peroxide Initiator | 1.5 | 1.5 | 1.5 | 1.5 | 1.5 |
| Viscosity Reducer B | 10.0 | 10.0 | 10.0 | 10.0 | 10.0 |
| Zinc Stearate | 12.0 | 12.0 | 12.0 | 12.0 | 12.0 |
| CaCO₃ | 662.0 | 662.0 | 662.0 | 662.0 | 662 |
| MgO dispersion 30 wt % in styrene and carrier resins | 13.0 | 13.0 | 13.0 | 13.0 | 13.0 |
| TOTAL: | 1000.0 | 1000.0 | 1000.0 | 1000.0 | 1000.0 |

FORMULATION 18

Hydroxypropylmaleate-b-poly(diethyleneadipate)-b-hydroxypropylmaleatetriblock of Example 9 was formulated into an unsaturated polyester using the recipe of Table 13 formulation 18. Physical properties of this unsaturated polyester composition are shown in Table 14. This formulation 18 shows increased Flexural strain at both 23° C. and 150° C. It shows increased Tensile elongation at 150° C. with only a slight drop in Tensile strength at 150° C.

TABLE 14

PHYSICAL PROPERTIES OF MOLDED SAMPLES, FORMULATIONS 17 AND 18

| Formulation | 17 (Control) | 18 |
|---|---|---|
| Flexural (23° C.) | | |
| Modulus (Mpsi) | 0.74 ± 0.03 | 0.29 ± 0.01 |
| Strength (psi) | 5645 ± 480 | 2962 ± 63 |
| Strain % | 0.98 ± 0.09 | 1.88 ± 0.15 |
| Flexural (150° C.) | | |
| Modulus (Mpsi) | 0.11 ± 0.01 | 0.07 ± 0.01 |
| Strength (psi) | 1260 ± 100 | 1086 ± 92 |
| Strain % | 1.67 ± 0.08 | 2.61 ± 0.28 |
| Tensile (150° C.) | | |
| Strength (psi) | 665 ± 106 | 595 ± 30 |
| Elongation % | 0.57 ± 0.01 | 1.65 ± 0.20 |

TABLE 15

PHYSICAL PROPERTIES OF MOLDED SAMPLES, FORMULATIONS 17, 19, AND 20

| Formulation | 17 (Control) | 19 | 20 |
|---|---|---|---|
| Flexural (23° C.) | | | |
| Modulus (Mpsi) | 0.82 ± 0.05 | 0.39 ± 0.02 | 0.59 ± 0.04 |
| Strength (psi) | 5110 ± 390 | 4251 ± 187 | 5192 ± 38 |
| Strain (in/in) 100 | 0.80 ± 0.10 | 1.70 ± 0.10 | 1.34 ± 0.10 |
| Rel. Flexural Toughness | 1.00 | 1.77 | 1.65 |
| Tensile (150° C.) | | | |
| Strength (psi) | 700 ± 65 | 596 ± 51 | 746 ± 14 |
| Elongation % | 1.05 ± 0.25 | 1.51 ± 0.25 | 1.42 ± 0.28 |
| Rel. % Shrinkage on Cure | 0.06 | 0.02 | 0.03 |

TABLE 16

PHYSICAL PROPERTIES OF MOLDED SAMPLES, FORMULATIONS 17 AND 21

| Formulation | 17 (Control) | 21 |
|---|---|---|
| Flexural (23° C.) | | |
| Modulus (Mpsi) | 0.74 ± 0.03 | 0.47 ± 0.01 |
| Strength (psi) | 5646 ± 477 | 4885 ± 169 |
| Strain % | 0.98 ± 0.09 | 1.45 ± 0.07 |
| Rel. Energy at Failure | 1.00 | 1.32 |
| Flexural (150° C.) | | |
| Modulus (Mpsi) | 0.11 ± 0.01 | 0.09 ± 0.01 |
| Strength (psi) | 1260 ± 100 | 1233 ± 171 |
| Strain % | 1.67 ± 0.08 | 1.96 ± 0.44 |
| Tensile (150° C.) | | |
| Strength (psi) | 665 ± 106 | 736 ± 62 |
| Elongation % | 0.86 ± 0.33 | 1.45 ± 0.19 |
| % Shrinkage on Cure | 0.06 ± 0.01 | 0.10 ± 0.01 |

FORMULATIONS 19, 20, AND 21

Hydroxypropylmaleate-b-Poly(propylene adipate)-b-hydroxpropylmaleate triblock of Example 10 was formulated into an unsaturated polyester using the recipe of Table 13 formulations 19, 20, and 21. The physical properties are shown in Tables 15 and 16. In Table 15, the physical properties of formulations 19 and 20 show significant variation with the percent substitution of the block copolymer for the traditional polymeric components of the formulation. This allows one to custom formulate for the desired properties at 23° C. and 150° C. The Flexural strains and Tensile elongation are increased significantly over the control. The Tensile 150° C. strength is not significantly changed in achieving this higher elongation.

In Table 16, the physical properties show significant increases in the Flexural strain and Tensile elongation over the control sample while maintaining acceptable modulus.

These modified unsaturated polyester or vinyl ester compositions with their higher flexural strain to failure can be utilized as automotive structural components such as load bearing support members, body panels, aircraft components, housing for various electrical and household goods, sporting goods such as golf club shafts, rackets, etc.

While in accordance with the Patent Statutes, the best mode and preferred embodiment has been set forth, the scope of the invention is not limited thereto, but rather by the scope of the attached claims.

What is claimed is:

1. A molding resin composition comprising:
   a) an unsaturated polyester resin,
   b) one or more ethylenically unsaturated monomers, and
   c) from about 1 to about 50 parts by weight of one or more block copolymers having the formula AB or ABA, or mixtures thereof or ABA and $A(BA)_n$, where the amount of ABA in said mixture of ABA and $A(BA)_n$ is at least 50 weight percent, said AB, ABA, and $A(BA)_n$ block copolymers having A blocks and B blocks, where n is from 2 to 5, said A blocks being unsaturated polyester blocks having a molecular weight of from about 100 to about 5,000 polymerized from monomers consisting essentially of one or more members each from
      1) saturated cyclic ethers having 2 or 3 carbons in the ether ring and a total of 2 to 18 carbon atoms or alkyl diols,
      2) one or more unsaturated dicarboxylic acids or their anhydrides having 4 to 20 carbon atoms, and
      3) optionally saturated dicarboxylic acids or their anhydrides having from 4 to 20 carbon atoms
   said B blocks being flexible polyether or saturated polyester polymers having a Tg of 0° C. or less and wherein said parts by weight are based on 100 parts by weight of said unsaturated polyester resin and ethylenically unsaturated monomers.

2. A molding composition according to claim 1 comprising;
   a) from about 25 to about 60 parts by weight of said unsaturated polyester resin,
   b) from about 40 to about 75 parts by weight of said one or more ethylenically unsaturated monomers,
   c) from about 1 to about 50 parts by weight of said one or more block copolymers, and
   d) up to 40 parts of a low profile additive, wherein all the above parts are by weight based upon 100 parts by weight of a and b.

3. A molding composition according to claim 2, wherein said polyether polymers are made from one or more cyclic ethers having from 2 to 10 carbon atoms and said saturated polyester polymers are made from the reaction product of one or more dicarboxylic acids or their anhydrides having from 1 to 10 carbon atoms and one or more cyclic alkylene oxides or one or more glycols having from 2 to 15 carbon atoms or said saturated polyester polymers are made by ring-opening polymerization of a cyclic lactone having 3 to 6 carbon atoms per repeat unit.

4. A molding composition according to claim 3, wherein said A blocks and said B blocks are connected by an ester linkage, an amide linkage, a urea linkage, or a urethane linkage, and wherein the Tg of said B blocks are minus 20° C. or less.

5. A molding composition according to claim 4, wherein the molecular weight of said unsaturated polyester A blocks are from above 600 to about 2,000.

6. A molding composition according to claim 5, wherein said A blocks are connected to said B blocks by an ester linkage and wherein said B blocks are saturated polyester blocks.

7. A molding composition according to claim 6, wherein the molecular weight of said unsaturated polyester, a, is from about 1,000 to about 5,000.

8. A molding composition according to claim 5, wherein said ethylenically unsaturated monomers are at least 50 weight percent styrene, wherein said composition includes up to 80 weight percent filler, and wherein said composition optionally includes fibers.

9. A molding composition according to claim 8, wherein said B blocks are said polyether polymers.

10. A molding composition according to claim 2, wherein the ethylenically unsaturated monomers are at least 50 weight percent styrene.

11. A molding composition according to claim 2, wherein the molecular weight of the A block is from 100 to 500.

12. A molding composition according to claim 11, wherein the B block is said saturated polyester.

13. A molding composition according to claim 12, wherein the ethylenically unsaturated monomers are at least 50 weight percent styrene.

14. A molding composition according to claim 13, wherein the saturated B block has a molecular weight from 500 to 3000 and is made from at least adipic acid and at least from one glycol selected from the group consisting of ethylene glycol, propylene glycol, and diethylene glycol.

15. A molding composition according to claim 13, wherein said A block is made from maleic acid and/or maleic anhydride with ethylene oxide, propylene oxide, and/or alkyl diols, or combinations thereof.

16. A cured molding composition comprising the reaction product of at least;
  a) about 25 to about 60 parts of an unsaturated polyester resin,
  b) about 40 to about 75 parts of one or more ethylenically unsaturated monomers,
  c) about 1 to about 50 parts of curable block copolymers having the formula AB or ABA or mixtures thereof or a mixture of ABA and A(BA)$_n$ where n is 2 to 5, wherein the amount of said ABA in said mixture of ABA and A(BA)$_n$ is at least 50 weight percent, wherein said block copolymer has A blocks and B blocks, wherein said A blocks are unsaturated polyester blocks having a molecular weight of from 100 to 5,000 polymerized from monomers consisting essentially of one or more members each from
    1) saturated cyclic ethers having 2 or 3 carbons in the ether ring and a total of 2 to 18 carbon atoms or alkyl diols,
    2) unsaturated dicarboxylic acids or their anhydrides having 4 to 20 carbon atoms, and
    3) optionally saturated dicarboxylic acids or their anhydrides having from 4 to 20 carbon atoms, wherein said B blocks have a Tg of 0° C. or less and are saturated polyesters or polyethers,
  d) up to 40 parts of a low profile additive, wherein all the above parts are based on 100 parts by weight of a and b.

17. A cured molding composition according to claim 11, wherein said polyether is a polymer made from one or more cyclic ethers having from 2 to 10 carbon atoms and wherein said saturated polyester is made from the reaction product of one or more dicarboxylic acids or their anhydrides having from 1 to 10 carbon atoms and one or more alkyl glycols having from 2 to 15 carbon atoms or is made from the ring-opening polymerization of a cyclic lactone having from 3 to 6 carbon atoms per repeat unit.

18. A cured molding composition according to claim 17, wherein said unsaturated polyester A blocks have a molecular weight of from above 600 to about 2000 and wherein said ethylenically unsaturated monomers are at least 50 weight percent styrene.

19. A cured molding composition of claim 16, including fibers and up to 80 weight percent filler, which is cured into a molded part.

20. A cured molding composition of claim 16, wherein said A block has a molecular weight from 100 to 600 and which is cured as a shaped article.

21. A cured molding composition according to claim 20, wherein said one or more ethylenically unsaturated monomers are at least 50 percent styrene.

22. A cured molding composition according to claim 20, wherein said B block is a saturated polyester.

23. A cured molding composition according to claim 22, wherein said B block has a molecular weight from 500 to 3000.

24. A cured molding composition according to claim 23, wherein said A block is made from at least maleic acid or its anhydride and at least from ethylene oxide, propylene oxide, or alkyl diols.

25. A composition comprising:
  a) an unsaturated polyester resin,
  b) one or more ethylenically unsaturated monomers,
  c) from about 1 to 50 parts by weight of one or more block copolymers having the formula AB or ABA or combinations thereof, or ABA and A(BA)$_n$ where n is from 2 to 5, wherein the amount of ABA in the mixture of ABA and A(BA)$_n$ is at least 50 weight percent, said block copolymers having unsaturated polyester A blocks of molecular weights from 500 to 5000 and B blocks which are flexible polymers having a Tg of 0° C. or less and being saturated polyesters or polyethers, and
  d) optionally up to 40 parts by weight of a low profile additive,
  said block copolymers further being the reaction product of reacting mono or difunctional unsaturated polyester A blocks with mono or difunctional flexible polymer B blocks.

26. A composition according to claim 25, wherein the B blocks are the reaction product of one or more dicarboxylic acids or their anhydrides having from 1 to 10 carbon atoms and one or more cyclic alkylene oxides or one or more glycols having from 2 to 15 carbon atoms or are a polyester from ring-opening polymerization of a cyclic lactone having from 3 to 6 carbon atoms per repeat unit.

27. A composition according to claim 25, wherein the B blocks are made from one or more cyclic ethers having 2 to 10 carbon atoms.

* * * * *